United States Patent
Scheele et al.

(10) Patent No.: US 6,377,298 B1
(45) Date of Patent: Apr. 23, 2002

(54) METHOD AND DEVICE FOR GEOMETRIC CALIBRATION OF CCD CAMERAS

(75) Inventors: Martin Scheele, Brieselang; Thomas Terzibaschian, Berlin, both of (DE)

(73) Assignee: Deutsche Forschungsanstalt Für Luft - und, Köln (DE)

( * ) Notice: Subject to any disclaimer, the term of this patent is extended or adjusted under 35 U.S.C. 154(b) by 0 days.

(21) Appl. No.: 09/107,564

(22) Filed: Jun. 29, 1998

(30) Foreign Application Priority Data

Jun. 27, 1997 (DE) .......................................... 197 27 281

(51) Int. Cl.[7] .......................... H04N 17/00; H04N 17/02
(52) U.S. Cl. ............................................. 348/187; 359/9
(58) Field of Search .............................. 348/40, 41, 49, 348/189, 187, 188, 175; 250/208.1; 359/9, 15, 1; H04N 17/00, 17/02

(56) References Cited

U.S. PATENT DOCUMENTS

| | | | |
|---|---|---|---|
| 4,376,950 A | * 3/1983 | Brown et al. | 348/40 |
| 5,184,232 A | * 2/1993 | Burney | 348/40 |
| 5,444,481 A | 8/1995 | Oshima et al. | |
| 6,147,702 A | * 11/2000 | Smith | 348/41 |

FOREIGN PATENT DOCUMENTS

DE  195 36 297  4/1997

OTHER PUBLICATIONS

Article entitled "Geometric Calibration of Digital Three–Line CCD Cameras" by Timm Ohlhof, Wolfgang Kornus, pp. 71–81 published in Int–ArcPhRS = International Archives of Photogrammetry and Remote Sensing.

* cited by examiner

*Primary Examiner*—Michael Lee
(74) *Attorney, Agent, or Firm*—Cohen, Pontani, Lieberman & Pavane

(57) ABSTRACT

A device for the geometric calibration of a CCD camera, which includes a coherent light source and a synthetic hologram arranged relative to the coherent light source so that the hologram generates a real three-dimensional test structure $f(x,y,z)$ around a focal plane of the CCD camera using coherent light. A method for geometric calibration of a CCD camera using a coherent light source and a synthetic hologram which includes the steps of calculating the synthetic hologram to provide a well-defined ideal three-dimensional test structure $f(x,y,z)$ taking into account idealized camera optics of the CCD camera to be calibrated, illuminating the hologram using the coherent light source so that a real three-dimensional test structure $f(x,y,z)$ is generated around a focal plane of the CCD camera, and evaluating in parallel a plurality of sensor pixels by determining a respective section plane through the real test structure $f(x,y,z)$ from individual image information of each of the plural sensor pixels.

5 Claims, 1 Drawing Sheet

METHOD AND DEVICE FOR GEOMETRIC CALIBRATION OF CCD CAMERAS

BACKGROUND OF THE INVENTION

1. Field of the Invention

The invention relates to a method and a device for the geometric calibration of CCD cameras.

2. Description of the Related Art

In CCD cameras, either a CCD matrix or one or more CCD lines is/are located in the focal plane behind the optical system. Geometric calibration is the determination of the viewing direction of every individual sensor pixel in the object space. If ideally distortion-free optics are used and the geometric location of every sensor pixel in the focal plane is known, the respective viewing direction can be calculated in a simple manner. However, in the case of real optics, distortions are unavoidable. Further, the sensor pixels have certain tolerances with respect to their position in the focal plane. This is due, on the one hand, to the fact that adjustment in the focal plane cannot be carried out exactly. On the other hand, because of deviations due to the technique for assembling or mounting the CCD matrix or CCD lines, the latter are not completely plane or flat, but have curves and/or bends. Another requirement for a method for geometric calibration is the determination of the imaging sharpness for the entire system.

In conventional photometric film cameras, fiducial marks are projected on the film to enable subsequent correction of imaging errors. This method is basically applicable to CCD cameras with matrices, but not for CCD lines. In order to calibrate CCD lines, CCD matrices would have to be arranged in the focal plane and they would have to be calibrated in relation to the CCD lines.

Therefore, a method has been developed for CCD cameras in which the CCD camera is arranged on a biaxial rotating table (T. Ohlhof and W. Kornus, "Geometric calibration of digital three line CCD cameras", Proceedings of the Symposium (ISPRS): Primary Data Acquisition and Evaluation, Sept. 12–16, 1994, Como, page 71). In this case, the CCD camera is illuminated from the object space by a fine parallel light beam which runs exactly along the optical axis in the zero position of the rotating table. By means of rotation about two angles, the camera can always be rotated into a position in which every individual pixel is illuminated. The two angles can then be used to determine the viewing direction. This method is disadvantageous in that it is very time-consuming due to the isolated individual measurement of every pixel. Further, this is an indirect method in which the viewing angles must be calculated from the measured values. In order to determine the imaging quality of the overall system, the point spread function (PSF) is measured in that the pixel-free light beam travels over a pixel in step sizes of less than one pixel dimension, which is likewise very time- consuming.

Further, the above-mentioned pixel-oriented calibration of a CCD matrix camera is known from U.S. Pat. No. 5,444,481, wherein predetermined image elements, by means of which the optical axis and the respective viewing direction can be determined, are arranged on the CCD matrix.

In addition, German reference DE 195 36 297 discloses a method for the geometric calibration of optical 3D sensors for three-dimensional measurement of objects relative to a reference coordinate system. The method utilizes at least one camera, a device for digitizing and storing image sequences of the camera, an illumination projector which is fixed with respect to the camera and generates temporally successive light structures formed of at least one-dimensional stripes within a working volume, an illumination device for illuminating reflecting signal marks of a calibrating device, and a computer for controlling and processing the images. The calibrating device is moved into different positions relative to the camera within and at the borders of the working volume and is illuminated in such a way that the regions of the signal marks of the calibrating device have the highest possible gray value modulation or color modulation in the digitized and stored images without overdriving or overmodulating.

The calibration of the camera is carried out by using a photogrammetric standard process for locating the inner and outer orientation. The projector has a light modulator which projects outwardly visible patterns of any stripes or pixels as image elements on the calibrating device. In order to calibrate the projector, this projector is considered an inverse camera in that a real or imaginary x-y projection pattern of defined width but indefinite length in the interior of the projector is associated with the outer image elements and a plurality of observations are used for determining the parameters of the inner and outer orientation of the illumination projector, wherein geometric relationships between the x-y projection patterns and the corresponding outwardly visible patterns are produced in these observations.

The calibrating parameters which are discovered and stored are reused when employing the 3D sensor system for measuring objects by an algorithm which corrects the beam geometries inside the camera and the projector on the one hand and calculates the x,y,z coordinates of the object in the object space based on the principle of triangulation on the other hand. A disadvantage in this method is that the focal length of the objective of the camera and of the projector must be adapted to one another. Further, the imaging of the projector must also be calibrated, so that the method in its entirety becomes even more time-consuming.

SUMMARY OF THE INVENTION

The time expended in the geometric calibration of a CCD camera is a serious drawback in the art. Therefore, it is an object of the present invention to provide a method for the geometric calibration of a CCD camera and a device for carrying out the method by which the calibration can be carried out more quickly than was previously possible.

To attain this, there is provided a device for the geometric calibration of a CCD camera which includes a coherent light source and a synthetic hologram arranged relative to the coherent light source so that the hologram generates a real three-dimensional test structure $f(x,y,z)$ around a focal plane of the CCD camera using coherent light.

There is also provided a method for geometric calibration of a CCD camera using a coherent light source and a synthetic hologram which includes the steps of calculating the synthetic hologram to provide a well-defined ideal three-dimensional test structure $f(x,y,z)$ taking into account idealized camera optics of the CCD camera to be calibrated; illuminating the hologram using the coherent light source so that a real three-dimensional test structure $f(x,y,z)$ is generated around a focal plane of the CCD camera; and evaluating in parallel a plurality of sensor pixels by determining a respective section plane through the real test structure $f(x,y,z)$ from individual image information of each said plural sensor pixels.

By generating a well-defined three-dimensional test structure from whose function values the respective section plane can be deduced in a definite manner, the respective geometric orientation of every individual pixel and the point spread function (PSF) of the pixels can be determined simultaneously by an individual recording or picture. Based on the PSF, a focusing or sharpness adjustment can be carried out, namely the determination of the distance of the focal plane from a principal plane of the optical system. All of this leads to a considerable saving of measuring time. Further, the calibration can be automated easily and also carried out outside of the laboratory. This is especially advantageous if the objective and/or the focal plane of the calibrated CCD camera must be exchanged, which results in loss of calibration.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
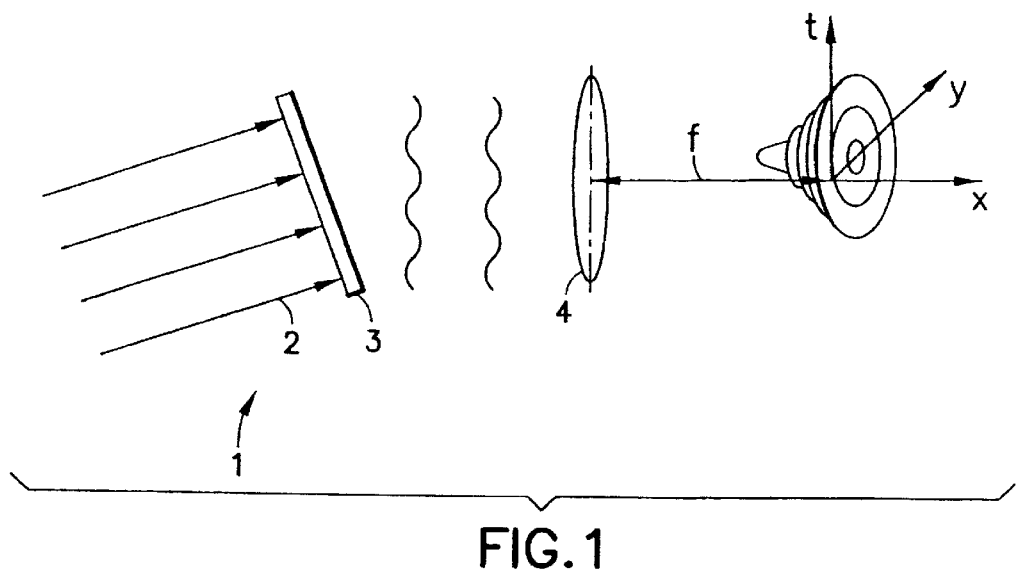
FIG. 1 shows a schematic view of the device for geometric calibration of a CCD camera pursuant to the present invention.

With reference to the Figures, FIG. 1 shows a schematic view of a device 1 for geometric calibration of a CCD camera. The calibration device 1 comprises a coherent light source for generating parallel white light 2 and a synthetic hologram 3 which is preferably formed as a white-light hologram. The synthetic hologram 3 is calculated beforehand in order to provide a well-defined three-dimensional test structure f(x,y,z) taking into account idealized camera optics 4 of the CCD camera to be calibrated and is subsequently produced by a known process for making holograms.

The coherent light source which is constructed, for example, as a laser, and the synthetic hologram 3 are arranged relative to one another so that the synthetic hologram 3 generates a real three-dimensional test structure f(x,y,z) around the focal plane of the CCD camera. The distance of the focal plane of the CCD camera from the camera optics 4 is ideally the focal distance or focal length f of the camera optics 4. Further, the focal plane is ideally arranged so that its X coordinate is constant.

The CCD lines or CCD matrices of the CCD camera are arranged on the focal plane. If the focal plane is correctly adjusted relative to the camera optics and the CCD elements arranged on the focal plane are flat relative to the focal plane, each of the individual CCD pixels detects a function value f(x=const.,y,z) of the three-dimensional test structure. On the other hand, if the CCD elements arranged on the focal plane are curved and/or bent, adjacent CCD pixels detect function values f(x,y,z) with different x-values. With reference to the detected function values f(x,y,z), the real position of every individual CCD pixel can be deduced. A possible function f(x,y,z) for the three-dimensional test structure is, for example:

$$f(x, y, z) = f(\vec{r}) \sim \frac{\sin(\vec{k}\vec{r})}{\vec{k}\vec{r}}$$

Figure 2:
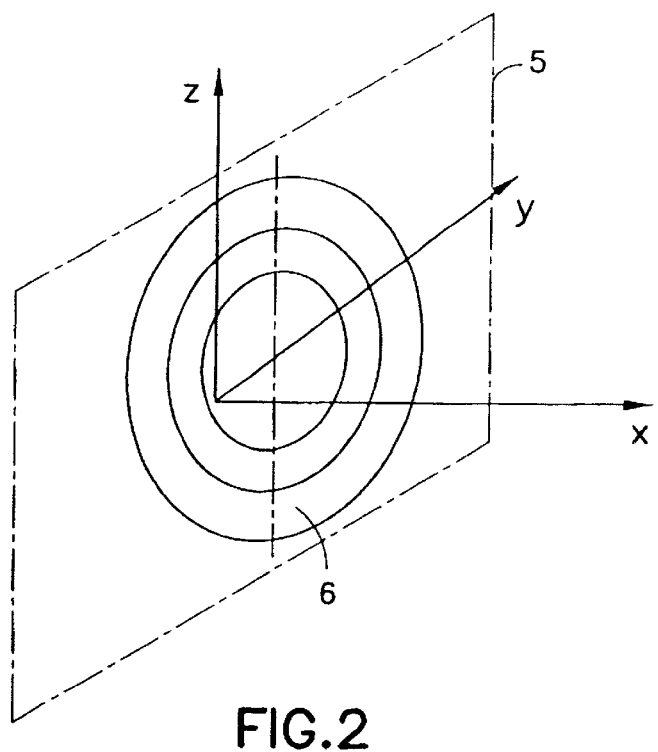
FIG. 2 is a view of the section planes of a real focal plane.

With reference to FIG. 2, this is a view of the section planes of a real focal plane. The real focal plane position 5 and the respective associated two-dimensional section planes 6 of the three-dimensional test structure are shown in dashed lines in FIG. 2.

While there have shown and described and pointed out fundamental novel features of the invention as applied to several preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A device for the geometric calibration of a CCD camera, comprising:
   a coherent light source; and
   a synthetic hologram arranged relative to the coherent light source so that the hologram generates a real three-dimensional test structure f(x,y,z) around a focal plane of the CCD camera using coherent light from the light source, which test structure has function values from which a respective section plane can be deduced in a definite manner.

2. The device according to claim 1, wherein the coherent light source is a laser.

3. The device according to claim 1, wherein the coherent light source is a parallel white-light source.

4. The device according to claim 1, wherein the synthetic hologram is constructed as a white-light hologram.

5. A method for geometrically calibrating a CCD camera using a coherent light source and a synthetic hologram, comprising the steps of:
   calculating the synthetic hologram to provide a well-defined ideal three dimensional test structure f(x,y,z) taking into account idealized camera optics of the CCD camera to be calibrated;
   luminating the hologram using the coherent light source so that a real three-dimensional test structure f(x,y,z) is generated around a focal plane of the CCD camera; and
   evaluating in parallel a plurality of sensor pixels by determining a respective section plane through the real test structure f(x,y,z) from individual image information of each of said plurality of sensor pixels.

* * * * *